United States Patent
Adams

[11] 3,756,658
[45] Sept. 4, 1973

[54] COMPOSITE STYLED WHEEL CONSTRUCTION
[75] Inventor: Leslie R. Adams, Lansing, Mich.
[73] Assignee: Motor Wheel Corporation, Lansing, Mich.
[22] Filed: Oct. 14, 1971
[21] Appl. No.: 189,395

Related U.S. Application Data
[62] Division of Ser. No. 857,960, Sept. 15, 1969, Pat. No. 3,655,348.

[52] U.S. Cl............. 301/37 R, 301/63 R, 301/37 P
[51] Int. Cl............................................. B60b 7/00
[58] Field of Search............. 301/37 R, 37 P, 37 T, 301/37 S, 37 CM, 63 R; 295/7

[56] References Cited
UNITED STATES PATENTS

| | | |
|---|---|---|
| 1,871,619 | 8/1932 | Koyen................................ 301/108 |
| 2,148,995 | 2/1939 | Nelson.............................. 301/37 P |
| 2,829,915 | 4/1958 | Claveau................................ 293/71 |
| 2,895,175 | 7/1959 | Reuter.................................... 18/59 |
| 3,348,597 | 10/1967 | Goldberg............................ 152/323 |
| 3,517,968 | 6/1970 | Tally................................ 301/37 T |
| 2,994,979 | 8/1961 | Shoemaker..................... 301/37 CM |
| 3,356,421 | 12/1967 | Trevarrow.......................... 301/37 S |
| 2,822,016 | 2/1958 | Billingsley.................... 301/37 ST X |
| 3,669,501 | 6/1972 | Derleth.............................. 301/37 P |

FOREIGN PATENTS OR APPLICATIONS

| | | |
|---|---|---|
| 424,701 | 2/1935 | Great Britain......................... 295/7 |
| | 12/1960 | France.........................301/37C0 |

*Primary Examiner*—Richard J. Johnson
*Attorney*— Arthur Raisch, William J. Waugaman et al.

[57] ABSTRACT

An ornamental composite wheel for use on automotive passenger vehicles and the like including a conventional steel vehicle wheel having a drop center steel rim secured to a central steel disc provided with the usual bolt circle holes and a central aperture so that the disc can be mounted on an axle and drum or disc brake assembly. A high density urethane elastomer in the form of a three-dimensional contoured overlay is permanently attached to the outboard side of the wheel and has a decorative surface so that the elastomer overlay appears to be an integral metallic portion of the steel wheel.

22 Claims, 6 Drawing Figures

COMPOSITE STYLED WHEEL CONSTRUCTION

This application is a division of my co-pending application Ser. No. 857,960, filed Sept. 15, 1969, now U.S. Pat. No. 3,655,348.

This invention relates to a wheel and more particularly to a composite steel and elastomer wheel construction with a three dimensional deeply contoured ornamental outer face.

Automotive passenger vehicle wheels with three dimensional deeply contoured ornamental discs or bodies are usually produced by deep drawing a flat steel plate. These draws are usually so deep that the wheel disc must be formed in several stages or press operations and it is sometimes necessary to anneal a disc between some of the drawing stages. Such severe drawing operations are also accompanied by relatively short die and tooling life. For these reasons the deep drawing of ornamental wheel discs is a relatively expensive way of producing ornamental wheels.

Objects of this invention are to provide an ornamental wheel with side impact cushioning to prevent damage to the wheel, to provide a comparatively inexpensive wheel with deep three dimensional ornamental contours in the outboard face of the wheel, to provide such a wheel while retaining the high strength and impact resistance advantages of the time-proven conventional ductile steel wheel components and to provide a comparatively inexpensive method of making such a wheel.

These and other objects, features and advantages of this invention are disclosed in more detail in the accompanying detailed description and drawings in which.

Figure 1:
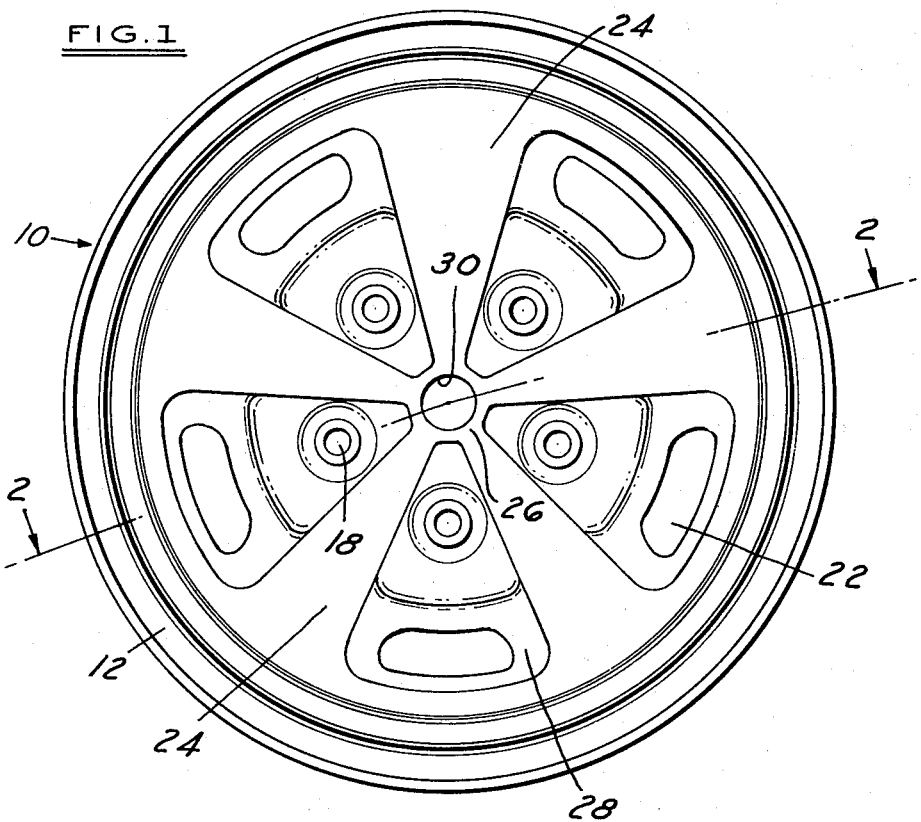
FIG. 1 is a plan view illustrating a wheel of this invention with a three dimensional contoured ornamental outboard face.
Figure 3:
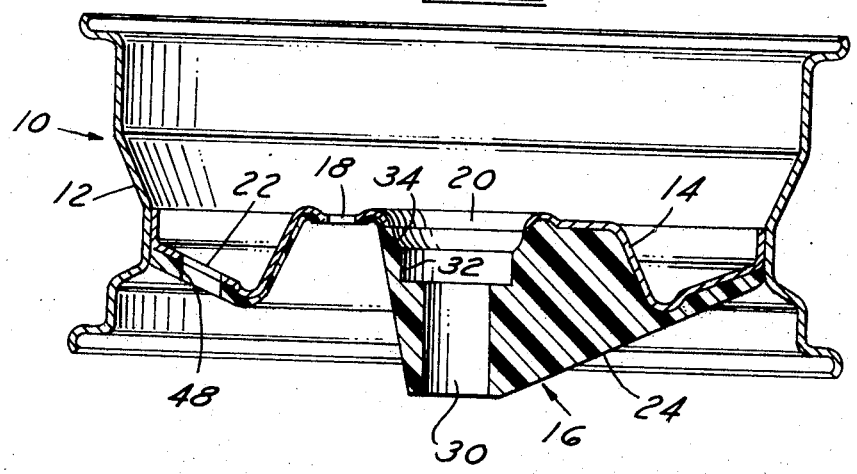
FIG. 3 is a cross sectional view on line 2—2 of FIG. 1 of the wheel body of FIG. 2 illustrating the overlay adhering to the wheel body after it has been removed from the mold.

Referring in detail to the drawings:

FIGS. 1 and 3 illustrate an ornamental wheel of this invention designated generally as 10 with a conventional drop center steel rim 12, a central disc or body 14 and an ornamental three dimensional contoured overlay designated at 16 secured to disc 14. Disc 14 is provided with a circle of bolt holes 18 and a central aperture 20 so that wheel 10 can be removably attached to a wheel spindle and disc or drum brake assembly. For decorative purposes and also for brake ventilation a plurality of cutouts 22 are provided in disc 14. The particular configuration of the steel components of the wheel, including rim 12 and disc 14, may follow solely utilitarian considerations such as strength of the wheel and ease and economy of manufacture, since the aesthetic appearance of the wheel is determined largely by the three dimensional contour of ornamental overlay 16. For example, in some applications disc 14 can be a generally flat steel plate or it can have a simple smooth saucer contour.

The three dimensional contours of overlay 16 are determined by the particular ornamental or aesthetic appearance desired by the designer of wheel 10. In the ornamental design of FIG. 1, overlay 16 is provided with heavy outwardly flaring spoke sections 24 which extend radially between the juncture of rim 12 and disc 14 and the central hub portion 26. Spokes 24 also extend axially or laterally outwardly away from disc 14 so that they form a segmented generally conical surface as best seen in FIG. 3. Generally triangular-shaped portions 28, each of which overlie a cutout 22 and a bolt hole 18, are recessed from the conical surface to emphasize the spoke design and to provide access to bolt holes 18 to facilitate securing wheel 10 to a drum or disc brake and spindle assembly. To provide clearance for a spindle and the bearing mounting of a brake drum, an aperture 30, counterbore 32 and bevel 34 are provided through the central portion 26 of overlay 16.

Figure 2:
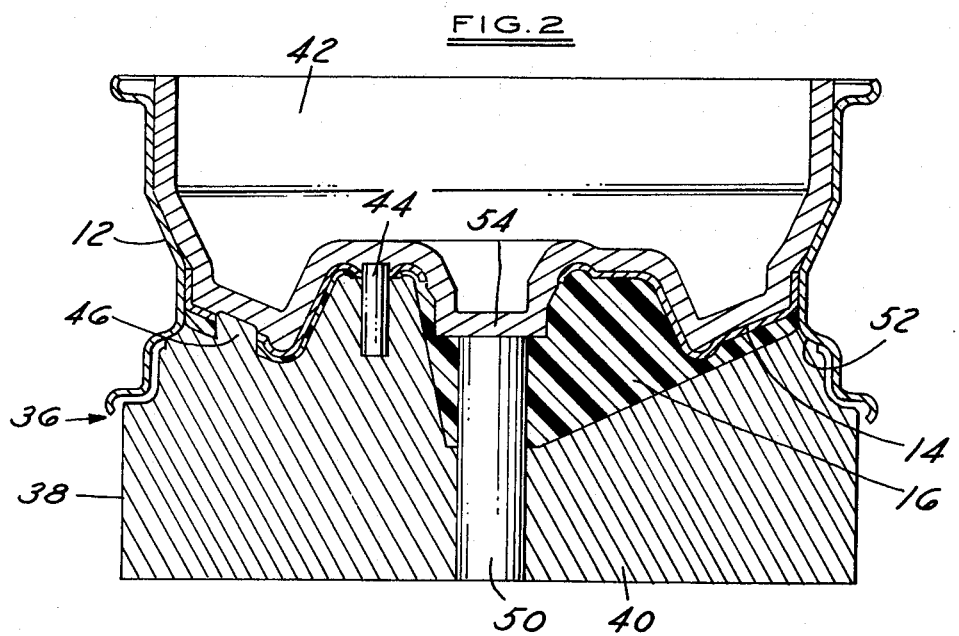
FIG. 2 is a cross sectional view of a mold for forming a three dimensional ornamental elastomer overlay as an integral part of the wheel and illustrates in cross section on line 2—2 of FIG. 1 the wheel body positioned in the closed mold.

Preferably the three dimensional contour of overlay 16 is formed by, and the overlay is adhered to a portion or all of disc 14 and a portion or all of rim 12, by suitable molding process or method described in more detail hereinafter. A suitable mold, designated generally as 36, for making overlay 16 from a urethane elastomer is illustrated in FIG. 2. Mold 36 has a lower half or bottom 38 with a cavity 40 which is shaped to provide the three dimensional contour of overlay 16. Mold 36 also comprises an upper half 42 which is shaped so that it will engage with the inner surface of disc 14 and rim 12 to provide a backup clamp or support for wheel 10 when it is placed in mold 36. A plurality of pins 44 are provided in the lower mold half 38 for registry with bolt holes 18 to positively locate the wheel circumferentially in mold 36. A plurality of bosses 46 protrude from mold bottom 38 into die cavity 40 and serve to positively locate the wheel circumferentially by engaging in disc cutouts 22 and also provide a core so that similar cutouts 48 (FIG. 3) will be formed in overlay 16 when it is cast in th mold. A cylindrical core 50 is provided in mold cavity 40 to form central aperture 30 in overlay 16 when it is cast in mold 36. Lower mold half 38 is provided with an annular lip 52 adjacent to the outer edge of cavity 40 on which wheel rim 12 is seated with a close fit to provide a seal between the cavity and rim 12 of the wheel so that when overlay 16 is formed the casting material will not be forced out of or leak from mold 36. A central portion 54 of upper mold half 52 extends below disc 14 and cooperates with central core 50 to provide a positive stop which limits the closure of mold 36. Central portion 54 also provides a core in cavity 40 to form counterbore 32 and bevel 34 of overlay 16.

Suitable plastic materials for molding or casting overlay 16 are synthetic rubber materials generally but preferably high density, non-cellular urethane elastomers and micro-cellular urethane elastomers such as those sold by The Goodyear Tire & Rubber Company. These urethane elastomers form a high density "solid rubber" type overlay having a density on the order of 50 to 55 lbs. per cubic foot which provides a resilient protective padding well adapted to cushion side impacts and thereby reduce or prevent damage to the structural steel components of the wheel. This urethane elastomer has the ability to chemically bond to a clean metal surface, thereby eliminating the necessity of securing the overlay to the wheel disc by some additional adhesive material. While the urethane will adhere to a clean metal surface, it is preferred to bonderize or provide a phosphate coating on disc 14 before the wheel is placed in mold 36 to provide improved adhesion of overlay 16 to the wheel body. The urethane elastomer when cast against a mirror finish mold surface also provides a very smooth, shiny and impervious surface which may be painted or otherwise covered with a decorative coating and when so covered will appear to be an integral metallic portion of the steel wheel. Due to the high density of this urethane elastomer and its non-cellular or closed cell micro-cellular structure, it will not absorb moisture. This is particularly advantageous if the wheel and overlay are not painted or otherwise covered immediately after the overlay is molded or if the paint becomes chipped or its integrity is in some other way destroyed.

If the wheel and overlay are to be painted, it is preferable to use a urethane paint because it has a high gloss and tensile strength and can stretch and contract with movement of the underlay without cracking. One example of a color stable coating or paint for covering the polyurethane casting 16 is disclosed in U.S. Pat. application of Anthony F. Finelli and James C. West, Ser. No. 467,115, filed June 25, 1965 and assigned to The Goodyear Tire & Rubber Company, parent company of assignee herein. Further disclosures pertaining to the making of paints useful for applying a coating over casting 16 will be found in U.S. Pat. Nos. 3,267,078 and 3,420,800.

Mold 36 is usually formed from either metal or epoxy resin reinforced with fiber glass. If mold 36 is made from metal, preferably mold cavity 40 will be nickel plated and polished to provide a very smooth mirror surface so that when the molded overlay is painted or covered with some other finish it will have a shiny or high gloss metallic appearance. A flexible mold liner can also be used with the above construction.

Figure 4:
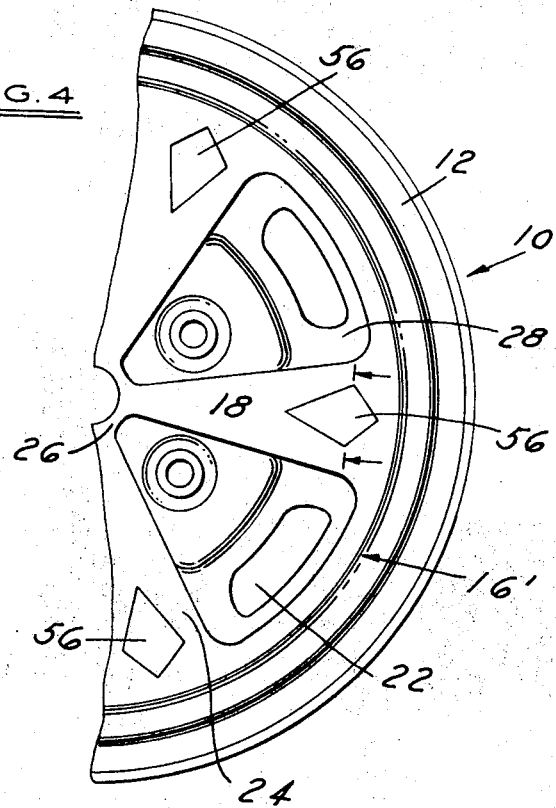
FIG. 4 is a fragmentary plan view of a wheel of this invention illustrating a decorative trim panel inserted in the outboard face of the overlay of the wheel.
Figure 5:
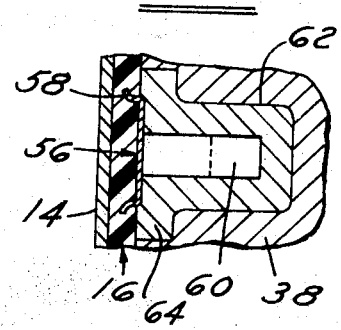
FIG. 5 is a fragmentary sectional view of the lower half of a mold illustrating a way of positioning the decorative trim panel in the mold.

Trim panels can also be inserted or attached to the overlays to provide an additional ornamental or decorative effect. FIG. 4 illusrates a diamond-shaped trim panel 56 mounted in the outboard face of each spoke portion 24 of overlay 16. Trim panel 56 can be a polished or plated metal insert such as a polished stainless or chrome plated steel insert and a real or simulated wood veneer secured to a metal backing plate or a transparent or translucent vinyl trim piece with a vacuum metalized inner surface. As shown in FIG. 5, trim plates 56 are formed with tabs or ears 58 which extend inwardly into the mold cavity to become embedded in the cast elastomer material to assure that trim plate 56 is mechanically secured or attached to overlay 16.

Trim panel 56 can be readily secured to overlay 16 by first positioning the trim panel in the lower half 36 of mold 38 and then casting the urethane elastomer in the mold so that tabs 58 of trim panel 56 become surrounded by and embedded in urethane elastomer when overlay 16 is formed. Trim panel 56 must be securely held in the mold so that it will not be shifted or knocked out of position when the urethane elastomer is injected into the mold. It must also be released or releasable from the mold after overlay 16 is formed so that the trim panel can be removed from the mold with the overlay. FIG. 5 illustrates one means for positioning trim piece 56 in lower mold half 38. A permanent magnet 60 is mounted in a flexible liner 64 of a mold pocket 62 in lower mold half 38. Liner 64 seals trim panel 56 in the molding operation and compensates for normal manufacturing variations in the thickness and configuration of trim panel 56.

The wheel with three dimensional ornamental contour is made by opening mold 36 and coating the surface of core 50 and the surface 40 of the lower mold half 38 with a parting or mold release compound such as Dow Corning 203 Fluid, Chem Trend P5Cl, a polyethylene dispersion in water or a suitable low boiling solvent such as hexane or the naphthas to prevent the urethane material from sticking to the surface 40 of the cavity. If a trim piece 56 is utilized it is inserted into cavity 40 and held in place by magnet 60. The urethane material in liquid form is poured into the mold cavity from a mixing head of a conventional polyurethane mixing machine which meters and mixes the two-part (or more) reactive components to supply the appropriate amounts of resin and catalyst. The wheel body 14 is immediately positioned over locating pins 40 and bosses 46 on the lower mold half 38, and then the upper mold half or lid 42 is closed to engage the upper side of wheel body 14 and rim 12. This seals the mold cavity to the wheel at lip 52 and reinforces the wheel body against pressure due to an excess of, or expansion of, the urethane material. The urethane material is partially or completely cured in the mold which causes overlay 16 to mechanically and chemically adhere to disc 14 of the wheel. The mold is then opened and the wheel with the integral three dimensionally contoured ornamental overlay 16 cast thereagainst is removed from the mold. The mold is usually maintained at an elevated temperature between room temperature and 200°F., the upper half or so of this range, say from about 150°F. and above, being preferred for the polyurethane reaction materials specified hereinafter, and the wheel body can be preheated prior to being placed in the lower half of the mold to reduce the time required to cure the urethane material. The particular temperature of the mold and the use of a preheated wheel will depend upon the curing characteristics of the particular urethane material that is used to form the overlay. If it is desired to further mechanize the molding operation the urethane material in liquid form can be injected into the mold cavity after it has been closed (as set forth in FIG. 6) rather than being metered into the cavity before the wheel is placed on the lower half of the mold. Also, suitable holes may be provided in the disc or rim of the wheel in non-critical locations to facilitate injection or urethane material and/or to help vent the mold cavity.

Preferably, in accordance with the present invention, an isocyanate base elastomer material is provided and caused to cure without blowing in the mold cavity. Elastomeric non-blowing materials which are particularly useful for the purpose of the present invention are the polyurethane materials having varying but relatively high densities. These rubber-like materials may be formed by reacting a wide variety of polymeric materials, such as polyester, polyol polyesteramides, polyalkylene glycol or polyols, castor oil and other materials having a plurality of reactive hydrogen groups, usually two to three but also four or more, with organic polyisocyanates in the presence of accelerators and/or cross linking agents and/or other additional agents such as plasticizers for modifying the characteristics of the end product urethane material. The formation of non-blowing polyurethane plastics involves a series of complex, physical and chemical reactions in which the evolution of carbon dioxide gas resulting from a reaction of carboxyl and isocyanate groups and/or between water and isocyanate groups is prevented to insure the end product has a non-blowing or non-cellular character, as is well understood in the art.

Examples of suitably polymeric materials which may be used in the production of suitable urethane elastomers for use in the present invention are polyesters and polyesteramides such as may be obtained by condensing a variety of polybasic acids, preferably dibasic acids such as adipic, sebacic, phthalic, oxalic, malonic, succinic, maleic, funmaric, itaconic, etc., with polyalcohols such as ethylene glycol, diethylene glycol, glycerol, surbitol and/or amino alcohols such as ethanolamine and amino propanol. Alkylene glycols and polyoxyalkylene glycols which may be used include ethylene glycol, propylene glycol, styrene glycol, diethylene glycol and polypropylene glycol and copolymers of these glycols. A high grade castor oil may also be used. Polyols having 3 or 4 hydroxyls or higher can be used, so long as the resulting polyurethane is not so brittle as to break upon impact, such as occurs when curbing a tire.

Examples of suitable organic polyisocyanates which may be used include the aliphatic, cyclo-aliphatic, and aromatic isocyanates such as toluene 2,4 diisocyanate, toluene 2,6 diisocyanate and mixtures thereof, naphthalene 1,5 diisocyanate and m-phenylene diisocyanate, etc., and mixtures of these materials, and methylene bis-(phenylene isocyanate) cyclohexylene diisocyanate, PAPI, a polyaryl polymethane polyisocyanate.

Examples of components which may be used for promoting the polyaddition reaction between the above-mentioned polymeric materials having free hydrogen reactive groups and organic polyisocyanates, and providing essential acceleration of the reaction include ethyl ethanolamine, diethyl ethanolamine, pyridine, hexahydro dimethylaniline, methyl piperazine, dimethyl piperazine, tribenzyl amine, N-morpholine, N-methyl morpholine, and N-ethyl morpholine. The relative hardness of the polyurethane elastomer can be varied by a suitable selection in suitable proportion of the initial urethane forming ingredients.

Cross linkers to cure the liquid reaction mixture whether made by the one shot, prepolymer or quasipolymer method are represented by the lower polyols such as those used to prepare polyesters and the aromatic, aliphatic and cyclo-aliphatic polyamines and preferably the primary organic diamines. Representative examples of the diamines are methylene dichloroaniline (MOCA), ortho dichlorobenzidine, phenylenediamine, menthane diamine, and cyclo hexylene diamines.

Specific examples of particular urethane materials and the molding die temperatures and curing time, presented by way of illustration of the method and product of this invention and not by way of limitation, are as follows:

EXAMPLE 1

A polyurethane prepolymer was prepared by mixing 113 parts of about a two to three thousand molecular weight polypropylene ether triol having acrylonitrile grafted thereto with a one-tenth part of a commercial triethylene diamine and two-tenths part dibutyltin dilaurate. Then this mixture was reacted at a reactive index of 103 with 88 parts of a toluene diisocyanate adduct of the above polypropylene ether triol having 30 percent free isocyanate groups. Then this prepolymer was mixed with a liquid commercial methylene bis orthochloroaniline to give about 10 percent free isocyanate on the liquid polyurethane reaction mixture basis. This liquid polyurethane reaction mixture was then poured into the mold cavity of the mold of FIG. 2 to form the cast polyurethane portion of the ornamental and decorative overlay on said wheel and then placed in an air oven at about 180°F. to 200°F. for five to ten minutes prior to removing the mold to obtain the metal wheel having the decorative overlay adhered thereto. Then this polyurethane decorative overlay was given a spray coat of a commerical polyurethane paint having suspended therein aluminum metallic flecks to give the wheel the appearance of an aluminum casting.

EXAMPLE 2

A second liquid polyurethane reaction mixture suitable for making the decorative overlay for the metal wheel was prepared by mixing 18.5 parts of a polypropylene ether triol of 4,600 molecular weight with 31.5 parts toluene diisocyanate to form a prepolymer containing 28 percent free NCO. Then 25 parts of this prepolymer was mixed with 0.29 parts of triethylene diamine and 0.23 parts dibutyltin dialaurate and then this was mixed with 6.25 parts of a liquid aromatic diamine available under the trade name du Pont LD813 and commonly referred to as partly liquid MOCA.

EXAMPLE 3

In a modification of Example 2, the polypropylene ether triol, 18.5 parts, was reacted with 31.5 parts of toluene diisocyanate to form a prepolymer adduct containing 28 percent free NCO. Then this adduct was reacted with a 106 index with a mixture of 25 parts polypropylene triol, 6.25 parts of MOCA containing about three-tenths of a part respectively of triethylene diamine and stannous octoate to form a liquid polyurethane reaction mixture.

Figure 6:
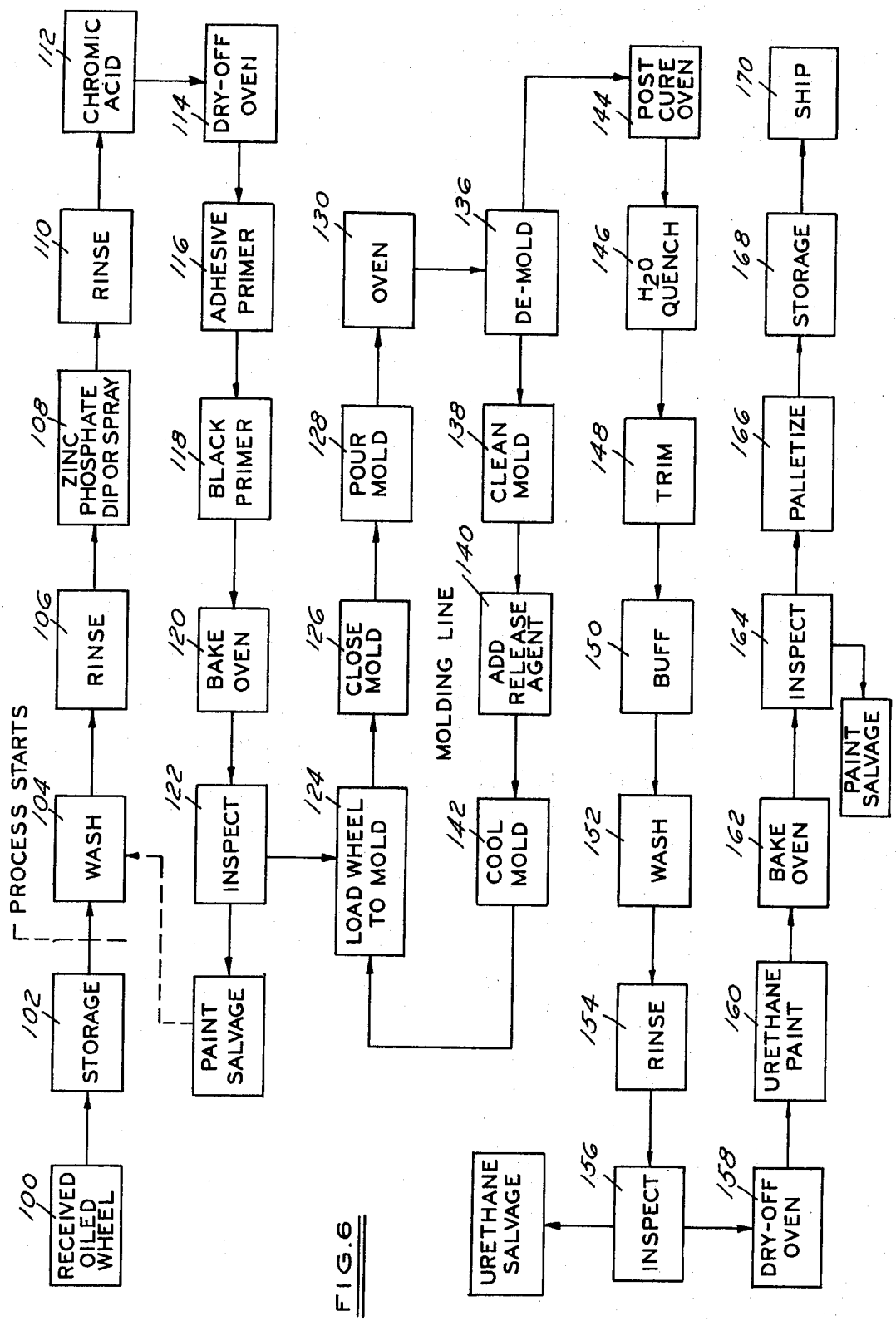
FIG. 6 is a block flow diagram illustrating in schematic form the sequence of steps involved in manufacturing a wheel of this invention, starting at the point where a unitary subassembly consisting of a steel rim and disc are received from a conventional wheel manufacturing facility, with the surfaces of the wheel oil coated.

Referring in more detail to FIG. 6, a production flow chart is illustrated for practicing the preferred and previously described cast-in-place embodiment of the method, with labelling added which in conjunction with the previous description will be readily understood by one skilled in the art. However, by way of further explanation, it should be understood that block 100 represents the unitary subassembly of rim 12 and disc 14 as received from a conventional wheel manufacturing facility. If the process is performed directly following the manufacture of the steel rim and disc subassembly, it is possible to eliminate the initial steps of oiling the wheel or otherwise coating it to prevent corrosion during storage. The steps up through block 122 all deal with treatment of this steel rim and disc subassembly prior to loading the same on the bottom 38 of mold 36 in the step represented by block 124. The steps set forth in blocks 104–114 inclusive represent a conventional zinc phosphate coating process. The "De-Mold" step of block 136 corresponds to the previously described step of opening mold 36 and removing the composite wheel consisting of the decorative overlay 16 molded to the disc 14 of the wheel 10. This part is then transferred to the post-cure oven indicated in block 144 and then subjected to a series of steps and routing as set forth in the blocks 146–170 downstream of block 144.

Although the urethane material poured or injected into the mold cavity in the step represented by block 128 can adhere by itself to a clean steel or zinc phosphated surface of disc 14, or to a coating of paint such as the usual black enamel primer paint which is customarily applied by the wheel manufacturer to the steel wheel rim and/or disc, it is preferred to precoat the outboard face of disc 14 (or whatever surface of the wheel is to be covered by the overlay 16) with a suitable adhesive compatible with the urethane material, and to cover the remaining surfaces of the wheel with the usual primer paint, followed by treatment in a bake oven to dry the paint and to help cure the adhesive prior to loading the wheel and disc subassembly into mold 36, these steps being indicated by blocks 116, 118 and 120 in FIG. 6. A conventional metal (steel)-to-urethane epoxy adhesive, such as that sold commercially under the trademark CONAP 1146–C, can be used in step 116 which adheres very securely to the zinc phosphate coated steel surface of disc 14. The urethane material poured in step 128 will chemically adhere to such an epoxy adhesive to provide a very high strength bond.

In regard to the adhesive for adhering the polyurethane reaction mixture to the wheel, reference may be made to U.S. Pat. No. 2,992,939 which discloses a suitable adhesive comprising a mixture of a resinous copolymer of from 50 to 80 percent by weight of styrene and from 50 to 20 percent by weight of acrylonitrile with a polyisocyanate, more fully described in U.S. Pat. No. 2,683,730 and which may be described as mixtures defined by the formula $OCN-R-(CY_2-R'-NCO)_n$ in which R and R' are arylene radicals, Y is selected from the group consisting of hydrogen, alkyl and aryl radicals, $n$ is a whole number, and the $-(CY_2-R'-NCO)$ groups in excess of 1 are attached to an R' radical, the mixtures containing at most 40 percent of the diisocyanate. The aforementioned CONAP 1146–C adhesive is an adhesive of this type.

Also, epoxies in combination with diamines per se or the diamines in the polyurethane reaction mixture may be utilized as adhesives. Generally, the epoxy compositions, such as the reaction products of epochlorohydrin and bisphenol A, such as Epon 828, are used with a diamine or in conjunction with a cement of the polyolefin rubber type such as polystyrene butadiene or polybutadiene acrylonitrile and a diamine.

It has been found that the step of curing the overlay in an oven after pouring the same, indicated in block 130, may be eliminated by placing the wheel and disc subassembly while still hot from step 120, i.e., at a temperature of about 180°F., in mold 36 (step 124) and then pouring the urethane in step 128 while the steel parts of the wheel are substantially at this temperature. This also enables the post-cure oven heating step 144 to be eliminated. Normally, in step 144 the composite wheel is heated to about 250°F. to eliminate any entrained air which might later bubble through the urethane paint applied in the step 160 when the same is being cured in a bake oven in step 162. Elimination of step 144 also eliminates the need for quenching step 146 wherein the composite wheel is cooled to permit handling in the subsequent steps 148 and 150.

It is to be understood that the density and surface hardness of overlay 16 may vary within relatively wide limits depending upon the aesthetic and/or functional end results desired in the composite wheel construction. For example, in one composite wheel constructed in accordance with the present invention it is desired to simulate a currently popular so-called "sport wheel" of the type having a rolled drop-center rim supported by a sand cast aluminum disc or body, such wheels having been popularized in drag and sports car racing. To achieve this in accordance with the present invention, an overlay 16 is cast against a conventional wheel as illustrated in FIG. 2 with the overlay positioned vertically beneath the wheel. The polyurethane reaction mixture of Example 1 is used with a very small part of retained water, approximately one-tenth of 1 percent, which is sufficient to produce a slight blowing action during the reaction, i.e., generation of carbon dioxide gas bubbles which permeates the urethane material when cured to thereby reduce the density to about 53 or 54 pounds per cubic foot as compared to a density of 70 pounds per cubic foot of non-cellular urethane.

Due to the orientation of the overlay beneath the wheel disc, the outboard face of the overlay is adjacent the lowermost surface of the mold cavity. Hence the gas bubbles tend to rise and migrate toward the inboard portion of the overlay closest to the wheel disc 14 while the reaction mixture is still liquid. This migration results in a variation in density axially of the overlay so that a relatively dense skin is produced adjacent the outboard face of the overlay, the urethane becoming less dense and more cellular axially towards disc 14. Any molding defects, such as large pockets or bubbles, will tend to occur adjacent or at the interface of overlay 16 and disc 14 where, generally speaking, such defects are less critical and do not spoil the end product, as compared to casting overlay 16 with mold part 38 superimposed on the rim and disc subassembly which tends to locate such casting defects at the outboard face of the overlay.

The higher density skin at the outboard face of overlay 16 is advantageous from the standpoint of receiving a painted finish, or receiving a decorative surface texture or finish cast into the outboard surface of the overlay, as well as achieving a smooth relatively hard surface less susceptible to damage in use. Preferably the outboard face of overlay 16 should have a Shore A hardness in the range of at least 85 to 100, with the preferred material having a Shore A the hardness of about 90 to 95. Materials having a lower Shore A hardness of 30 to 60 could be used, but difficulty may be experienced in some applications with such materials flexing or distorting from impacts received as when curbing the wheel. Accordingly, the polyurethanes or elastomers employed in overlay 16 should have an outboard surface hardness at least equivalent to that of a pneumatic tire to be used with the wheel, such being usually a Shore A hardness of at least 60 and preferably about 70.

When using a slight blowing urethane material to provide a micro-cellular overlay 16, a wide range of densities may be obtained ranging downwardly to about 30 pounds per cubic foot. Non-rigid urethane elastomer materials are available having much lower densities than 30 pounds, ranging down into the 20 or 10 pound range, but the skins on an overlay cast from such material tend to be relatively porous, and hence difficulty is experienced in obtaining a satisfactory mirror-smooth surface to be painted, if such is the effect desired. However, when simulating a sand cast aluminum surface of the aforementioned sport wheel, a less dense and more cellular urethane overlay is desirable inasmuch as painting the same with a conventional metallic aluminum paint will result in the paint solvents partially etching the surface and opening up the pores. This in turn gives a surface appearance substantially identical to that of sand cast aluminum. Similarly, if a wood grain effect is to be imparted to the outboard face of the overlay, low density highly cellular urethane overlays are advantageous since they lend themselves to etching finish treatments used in bringing out simulated wood grain effects.

On the other hand, the higher density materials are preferred from the standpoint of structural strength needed to maintain the shape of the overlay, particularly where relatively complicated contours are employed in the overlay, such as protruding air scoops and the like which must retain their physical shape and orientation even when subjected to the distortional effects of road shocks and bump impacts, curb scuffing and centrifugal forces exerted at high wheel speeds. For this reason, densities on the order of 50 pounds or more per cubic foot are generally preferred in constructing the composite decorative wheel constructions of the present invention. A density of 53 to 54 pounds per cubic foot has been found to be highly satisfactory in producing the aforementioned sport wheel having an outboard surface painted with metallic aluminum paint and simulating sand cast aluminum, but with relatively deep axially extending air scoops requiring considerable structural strength in the overlay.

From the foregoing description it will now be understood that the composite wheel construction of the present invention provides several advantages. Hitherto it has been customary to "dress up" a non-decorative conventional steel wheel by removably affixing a decorative wheel cover to the outboard face of the wheel. However, with the decorative wheel construction of the present invention no additional wheel cover is needed, and at the same time a safer product is obtained because the non-metallic overlay is permanently affixed to the wheel in a very secure manner. Hence there is no accidental detachment problem, a hazard which is associated with conventional removable wheel covers which can and do on occasion fly off a wheel of a passenger vehicle while travelling at high speed. The mechanical fasteners, clips, etc. associated with wheel covers are also eliminated. Affixing the elastomer overlay to the wheel disc with a permanent adhesive bond during manufacture of the wheel rather than as a later add-on insures better control of this safety factor. The casting or molding in place of overlay 16 also insures that the mass of the decorative overlay is positioned in a concentric and arcuate relationship to the wheel disc and rim so that the resulting composite wheel is well balanced, dynamically and statically. Nevertheless, it is to be understood that in its broader aspect the present invention contemplates a composite wheel construction in which the elastomeric decorative overlay is cast or molded as a separate entity from the rim and disc of the wheel, and then subsequently permanently attached to the outboard face of the wheel rim and/or disc by a suitable adhesive. However, this alternative construction requires additional assembly and fixture apparatus in order to achieve the necessary concentricity and balance tolerances, and hence the cast-in-place method described previously is preferred because less production equipment is required and the separate attachment step is eliminated. In either embodiment, however, overlay 16 preferably constitutes a "homogeneous mass of an elastomer material," which term is intended to include such a body having its outboard face painted or otherwise coated, having filler extenders and/or metallic or other foreign material inserts embedded in its outer surface and/or having a density which varies due to the addition of fillers and/or due to variations in cell size and distribution. Despite these variations, "homogeneous" as used herein means the entire overlay (excluding subsequent surface treatments) is essentially the same material throughout and/or is formed in one operation, preferably casting or molding.

Another advantage of the composite decorative wheel of the present invention is the flexibility it provides to both the wheel designer and to the wheel manufacturer. The designer can exercise wider latitude in his choice of shapes and contours since he is no longer inhibited by the limitations involved in deep drawing of the metal of the wheel disc in order to achieve an aesthetically pleasing appearance. The wheel manufacturer can economically produce a standard steel wheel rim and disc subassembly for a whole series of different wheel designs, thereby greatly reducing production costs because of this standardization. The extensive capital investment required in drawing equipment is greatly reduced, and design changes can be quickly accomplished with only a minimum of re-tooling of the comparatively inexpensive molding equipment required to cast the non-metallic decorative overlay against the wheel.

Due to the elastomeric nature of overlay 16, it provides a further safety feature in that it serves as a cushion which offers protection to the main structural steel components of the wheel in the event of a side impact, as when the wheel strikes a curb, thereby reducing the exposure of these components to stress risers and cracks. It has also been found that the urethane elastomer will flow during pouring and curing into the minute clearance spaces between the rim and disc, between the circumferentially spaced spot or arc welds joining the same, to thereby provide a thin resilient cushion between these steel parts of the wheel which is believed to reduce wheel noise and transmission of noise through the wheel. It is to be understood that the overlay 16 may also cover a portion or all of the outboard face of the rim 12, and be adherently secured thereto in the same manner as it is to the disc. Such additional coverage helps further reduce any transmission of noise through the wheel. In some instances, overlay 16 may overlie and be secured to rim 12, leaving the disc 14 or a portion thereof uncovered and exposed to view.

The aforementioned filler material may be conventional polyurethane fillers such as clay, calcium carbonate, barium sulfate, polyvinyl chloride, etc. The filler may constitute up to about 50 parts of filler per 100 parts of polyurethane by weight. The primary purpose of using a filler is as an extender to reduce the cost of the materials in overlay 16, but fillers such as the aforementioned materials also provide some improvement in physical characteristics such as increasing the tensile strength of overlay 16 and providing an outboard surface more compatible with certain types of paints. The addition of the aforementioned fillers increases the density of the overlay composition, one example being an overlay 16 constructed of the materials set forth in Example 1 and in addition containing 40 parts of a clay filler per 100 parts of the urethane mixture by weight, resulting in a density of about 89 pounds per cubic foot.

I claim:

1. A composite wheel including in combination a metallic portion comprising a wheel mounting disc and a rim secured to said disc and adapted to receive a tire thereon, and a plastic portion comprising an ornamental overlay disposed adjacent and covering at least part of the outboard face of said metallic portion, said overlay comprising a homogeneous body of an elastomer material, said body being permanently adhesively affixed to said metallic portion, the outboard face of said body being exposed to view from the outboard side of said wheel and having a decorative surface spaced axially of the wheel outboard from said inner face of said body, said outboard face of said body having a contour differing from the contour of the covered part of the outboard face of said metallic portion and adapted to provide decorative contour over at least part of the metallic portion of said wheel, said covered part of said metallic portion comprising said disc and said disc having a central aperture and wheel mounting fastener holes therein, said overlay having aperture means registering coaxially with said disc aperture and with said bolt holes in said disc and adapted to receive wheel hub and mounting parts therein.

2. The wheel construction as set forth in claim 1 wherein said rim and disc are made of steel, said rim having a conventional drop-center cross-sectional configuration and said disc having a generally simple saucer-like configuration.

3. The wheel construction as set forth in claim 1 wherein said elastomer material comprises polyurethane having a density in the order of 10 to 90 pounds per cubic foot.

4. The wheel construction as set forth in claim 1 wherein said overlay is adherently secured to said outboard face of said disc by an epoxy adhesive.

5. The wheel construction as set forth in claim 1 wherein said overlay is cast and cured against said metallic portion.

6. The wheel construction as set forth in claim 1 wherein said overlay is adhered to said metallic portion by a thin layer of an adhesive material applied to said covered part of the outboard face of said metallic portion between said overlay and said outboard face.

7. The wheel construction as set forth in claim 1 wherein said rim and disc are made of steel, said rim having a conventional drop-center cross-sectional configuration and said disc having a generally simple saucer-like configuration, said elastomer material comprising polyurethane having a density in the order of 50 to 90 pounds per cubic foot.

8. The wheel contstruction as set forth in claim 1 wherein said outboard face of said overlay has a decorative coating applied thereto.

9. The wheel construction as set forth in claim 8 wherein said outboard face of said overlay has a decorative coating applied thereto and said overlay is adherently affixed.

10. A composite wheel including in combination a wheel mounting disc, a rim secured to said disc and adapted to receive a tire thereon, said disc and rim components of said wheel comprising standardized parts providing substantially all of the structural vehicle load-bearing strength of said wheel, and an ornamental overlay disposed adjacent the outboard face of said disc, said overlay comprising a homogeneous body of cellular resilient elastomer material, the inner face of said body being disposed in contact with and adhered to the outboard face of said disc, said body being exposed to view from the outboard side of said wheel and having a water impervious decorative surface spaced axially of the wheel outboard from said inner face of said body, said body having an outboard contour having variations therein exceeding that of the inboard contour thereof and adapted to provide decorative contour over at least the disc portion of said wheel, said body having a higher density adjacent the outboard surface thereof and gradually decreasing in density toward the inner face thereof, said disc having holes therein for receiving wheel mounting fasteners, and said body being apertured to provide access to said disc holes from the outboard side of said wheel.

11. The wheel construction as set forth in claim 10 wherein said overlay is mechanically and chemically secured to the outboard face of said disc, said overlay comprising a casting cured from a slight blowing self-skinning polyurethane reaction mixture in a mold cavity, the uppermost surface of which conforms to the outboard face of said disc and cured while said cavity surface is disposed above said mixture.

12. The wheel construction as set forth in claim 11 wherein said rim and disc are made of steel, said rim having a conventional drop-center cross-sectional configuration and said disc having a generally saucer-like configuration, said rim and disc being secured by circumferentially spaced welds and having slight gaps between said welds at least partially filled with said elastomer material.

13. The wheel construction set forth in claim 12 wherein said outboard face of said body has decorative trim means secured thereto and covering only a portion of said outboard face.

14. The wheel construction set forth in claim 13 wherein said decorative trim means comprises at least in part a metallic member having tab means projecting therefrom inwardly of said outboard face of said body into said body and anchoring said trim means thereto.

15. The wheel construction set forth in claim 14 wherein said body is a solid material cast from a liquid material and said tab means is embedded in said cast material prior to solidification thereof.

16. A composite wheel including in combination a metallic wheel mounting disc, a metallic rim secured to said disc and adapted to receive a tire thereon, said disc and rim having surfaces defining an outboard face, and an ornamental overlay disposed adjacent said outboard face, said overlay cmprising a homogeneous body of micro-cellular urethane elastomer material, the inner surface of said body being disposed in contact with and adhered to at least part of said outboard face by an intermediate layer of adhesive material, the outboard surface of said body being exposed to view from the outboard side of said wheel, said outboard surface being water impervious and spaced axially of the wheel outboard from said inner surface of said body, said outboard surface of said body having a contour differing from the contour of said outboard face and adapted to provide decorative contour over at least the portion of said outboard face covered by said body.

17. A composite wheel including in combination a metallic portion comprising a wheel mounting disc and a rim secured to said disc and adapted to receive a tire thereon, and a plastic portion comprising an ornamental overlay disposed adjacent and covering at least part of the outboard face of said metallic portion, said overlay comprising a homogeneous body of an elastomer material, said body being adherently affixed to said metallic portion, the outboard face of said body being exposed to view from the outboard side of said wheel and having a decorative surface spaced axially of the wheel outboard from said inner face of said body, said outboard face of said body having a contour differing from the contour of the covered part of the outboard face of said metallic portion and adapted to provide decorative contour over at least part of the metallic portion of said wheel, said elastomer material comprising microcellular urethane material having a density in the order of 30 to 70 pounds per cubic foot, said outboard face of said overlay having a decorative coating applied thereto.

18. A composite wheel including in combination a wheel mounting disc, a rim secured to said disc and adapted to receive a tire thereon, and an ornamental overlay disposed adjacent the outboard face of said disc, said overlay comprising a homogenous body of cellular resilient elastomer material, the inner face of said body being disposed in contact with and adhered to the outboard face of said disc, said body being exposed to view from the outboard side of said wheel and having a water impervious decorative surface spaced axially of the wheel outboard from said inner face of said body, said body having an outboard contour differing from the inboard contour thereof and adapted to provide decorative contour over at least the disc portion of said wheel, said body having a higher density adjacent the outboard surface thereof and gradually decreasing in density toward the inner face thereof, said overlay being mechanically and chemically secured to the outboard face of said disc by casting and curing a slight blowing self-skinning polyurethane reaction mixture against said disc while said disc is disposed above said mixture.

19. A composite wheel including in combination a metallic portion comprising a wheel mounting disc and a rim secured to said disc and adapted to receive a tire thereon, and a plastic portion comprising an ornamental overlay disposed adjacent and covering at least part of the outboard face of said metallic portion, said overlay comprising a homogeneous body of an elastomer material, said body being affixed to said metallic portion, the outboard face of said body being exposed to view from the outboard side of said wheel and having a decorative surface spaced axially of the wheel outboard from said inner face of said body, said outboard face of said body having a contour differing from the contour of the covered part of the outboard face of said wheel, said rim and disc being made of steel, said rim having a conventional drop-center cross-sectional configuration and said disc having a generally saucer-like configuration, said rim and disc being secured by circumferentially spaced welds and having slight gaps between said welds at least partially filled with said elastomer material.

20. A composite wheel including in combination a metallic portion comprising a wheel mounting disc and a rim secured to said disc and adapted to receive a tire thereon, and a plastic portion comprising an ornamental overlay disposed adjacent and covering at least part of the outboard face of said metallic portion, said overlay comprising a homogeneous body of an elastomer material, said body being permanently adhesively affixed to said metallic portion, the outboard face of said body being exposed to view from the outboard side of said wheel and having a decorative surface spaced axially of the wheel outboard from said inner face of said body, said outboard face of said body having a contour differing from the contour of the covered part of the outboard face of said metallic portion and adapted to provide decorative contour over at least part of the metallic portion of said wheel, said outboard face of said body having decorative trim means secured thereto and covering only a portion of said outboard face.

21. The wheel construction set forth in claim 20 wherein said decorative trim means comprises at least in part a metallic member having tab means projecting therefrom inwardly of said outboard face of said body into said body and anchoring said trim means thereto.

22. The wheel construction set forth in claim 21 wherein said body is a solid material cast from a liquid material and said tab means is embedded in said cast material prior to solidification thereof.

* * * * *

UNITED STATES PATENT OFFICE
CERTIFICATE OF CORRECTION

Patent No. 3,756,658          Dated September 4, 1973

Inventor(s)    LESLIE R. ADAMS

It is certified that error appears in the above-identified patent and that said Letters Patent are hereby corrected as shown below:

On the information cover page, column 1, lines 9 and 10, item [62], after "Sept. 15, 1969," delete "Pat. No. 3,655,348" and insert --(now abandoned)--. On the information cover page, column 2, line 7, before "12/1960" insert the French patent number --1,250,631.

Column 1, lines 3 and 4, delete "now U.S. Pat. No. 3,655,348" and insert --(now abandoned)--; line 64, after "designated" insert --generally--. Column 2, line 50, "th" should be --the--. Column 4, line 58, after "injection", "or" should be --of--. Column 5, line 16, "suitably" should be --suitable--.

Column 12, cancel lines 4-7 (entire claim 9) and insert --9. The wheel construction as set forth in claim 1 wherein said elastomer material comprises micro-cellular urethane material having a density in the order of 50 to 70 pounds per cubic foot.--; line 66, "cmprising" should be --comprising--.

Signed and sealed this 1st day of January 1974.

(SEAL)
Attest:

EDWARD M. FLETCHER, JR.        RENE D. TEGTMEYER
Attesting Officer                Acting Commissioner of Patents